US010760634B2

(12) United States Patent
Mohseni et al.

(10) Patent No.: US 10,760,634 B2
(45) Date of Patent: Sep. 1, 2020

(54) BRAKE PAD MONITOR WITH CONDUCTIVITY MEASUREMENT

(71) Applicant: Robert Bosch GmbH, Stuttgart (DE)

(72) Inventors: Hamidreza Mohseni, Naperville, IL (US); Mark Phipps, Wayne, IL (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 3 days.

(21) Appl. No.: 16/289,085

(22) Filed: Feb. 28, 2019

(65) Prior Publication Data
US 2019/0293137 A1 Sep. 26, 2019

Related U.S. Application Data

(60) Provisional application No. 62/646,718, filed on Mar. 22, 2018.

(51) Int. Cl.
*F16D 66/02* (2006.01)
*F16D 65/092* (2006.01)
*F16D 69/04* (2006.01)
*F16D 69/02* (2006.01)

(52) U.S. Cl.
CPC ......... *F16D 66/027* (2013.01); *F16D 65/092* (2013.01); *F16D 69/02* (2013.01); *F16D 69/0408* (2013.01); *F16D 2069/0433* (2013.01); *F16D 2069/0466* (2013.01); *F16D 2200/0021* (2013.01); *F16D 2200/0034* (2013.01); *F16D 2250/0046* (2013.01); *F16D 2250/0069* (2013.01); *F16D 2250/0084* (2013.01)

(58) Field of Classification Search
CPC ...... F16D 66/02; F16D 66/021; F16D 66/024; F16D 66/027
USPC ........................................ 188/1.11 W, 1.11 L
See application file for complete search history.

(56) References Cited

U.S. PATENT DOCUMENTS

| 4,884,434 A | * | 12/1989 | Satake | F16D 66/027 73/7 |
| 5,608,376 A | * | 3/1997 | Ito | F16D 66/026 116/208 |
| 5,637,794 A | | 6/1997 | Hanisko | |
| 5,678,662 A | * | 10/1997 | Giorgetti | F16D 66/02 188/1.11 W |
| 5,939,978 A | * | 8/1999 | Kyrtsos | F16D 66/00 116/208 |

(Continued)

FOREIGN PATENT DOCUMENTS

| EP | 0419207 | 7/1994 |
| WO | 200106269 | 1/2001 |

*Primary Examiner* — Thomas W Irvin
(74) *Attorney, Agent, or Firm* — David Kovacek; Maginot, Moore & Beck LLP

(57) ABSTRACT

A brake pad apparatus having a conductivity sensor disposed thereon operable to generate conductivity data corresponding to the remaining thickness of the brake pad's friction lining. The conductivity data may be analyzed by a processor to estimate the remaining life of the brake pad for purposes of maintenance, diagnostic, or repair. The conductivity sensor may utilize a conductivity probe that comprises one or more insulation coatings to insulate conductive material from the friction lining. The brake pad apparatus may further comprise a wireless transmitter to transmit data to a processor external to the brake pad apparatus.

20 Claims, 6 Drawing Sheets

(56) References Cited

U.S. PATENT DOCUMENTS

| | | | | |
|---|---|---|---|---|
| 6,095,290 | A * | 8/2000 | Takanashi | F16D 66/024 188/1.11 E |
| 6,193,020 | B1 * | 2/2001 | Takanashi | F16D 66/02 188/1.11 L |
| 6,250,429 | B1 * | 6/2001 | Kramer | F16D 66/027 188/1.11 L |
| 6,290,027 | B1 * | 9/2001 | Matsuzaki | F16D 66/024 188/1.11 E |
| 6,302,241 | B1 * | 10/2001 | Gronowicz, Jr. | B60T 17/221 188/1.11 L |
| 6,338,397 | B1 * | 1/2002 | Gezgin | B60T 17/221 188/1.11 E |
| 6,345,700 | B1 * | 2/2002 | Zenzen | F16D 66/024 188/1.11 E |
| 6,360,850 | B1 * | 3/2002 | Odisho | F16D 66/024 188/1.11 L |
| 6,415,658 | B1 * | 7/2002 | Takanashi | F16D 66/024 340/453 |
| 6,446,764 | B1 * | 9/2002 | Huang | B60C 23/0408 188/1.11 L |
| 6,477,893 | B1 * | 11/2002 | Djordjevic | F16D 66/02 188/1.11 L |
| 6,564,909 | B1 * | 5/2003 | Razzano | F16D 66/027 116/208 |
| 7,165,657 | B2 * | 1/2007 | Palladino | F16D 66/026 188/1.11 E |
| 7,464,795 | B2 * | 12/2008 | Hurwic | B60T 7/107 188/1.11 E |
| 9,045,122 | B2 * | 6/2015 | Bosis | F16D 66/024 |
| 9,353,815 | B1 * | 5/2016 | Eden | F16D 66/027 |
| 9,945,437 | B2 * | 4/2018 | Eden | F16D 66/024 |
| 9,951,834 | B1 | 4/2018 | Eden | |
| 10,385,938 | B2 * | 8/2019 | Dohle | F16D 69/0408 |
| 2004/0069573 | A1 * | 4/2004 | Anderson | F16D 66/027 188/1.11 L |
| 2004/0168864 | A1 * | 9/2004 | Strauss | F16D 66/027 188/1.11 L |
| 2008/0190712 | A1 * | 8/2008 | Hagberg | F16D 65/092 188/1.11 L |
| 2015/0369318 | A1 * | 12/2015 | Kang | F16D 66/024 188/1.11 L |
| 2017/0335912 | A1 | 11/2017 | Koh et al. | |
| 2019/0128352 | A1 * | 5/2019 | Jain | F16D 66/027 |
| 2019/0351889 | A1 * | 11/2019 | Serra | B60R 16/033 |

* cited by examiner

BRAKE PAD MONITOR WITH CONDUCTIVITY MEASUREMENT

TECHNICAL FIELD

This disclosure relates to the monitoring of the physical state of a vehicle, and in particular the physical state of the brake pads of a vehicle. Monitoring of the physical state of the brake pads is performed using sensors to generate data that may be analyzed for diagnostic purposes.

BACKGROUND

Vehicle brakes rely on friction to control the speed and motion of the vehicle. The friction surfaces of the brakes suffer mechanical wear and require maintenance and replacement under normal operating conditions. Vehicle brakes comprise brake pads to provide an expendable friction surface in order to effectively provide braking functions while also provide inexpensive replacement of the friction surfaces. Monitoring the physical state of the brake pads provides drivers and technicians useful information regarding whether the brake pads need replacement.

Conventional brake pads use passive wear indicators, such as metal tabs that contact a rotor when the friction surface wears away enough to allow contact and make a noise from the contact providing a notification to a driver, and do not comprise an active real-time monitoring system. A brake pad monitor providing indications of the status of a brake pad at any point within the lifespan of the brake pad may be useful for vehicle passengers and technicians to perform diagnostics or maintain the vehicle. Further, the operational capacity of an autonomous vehicle may not be directly observed by a driver, including the operational capacity of the brakes. Thus, it may be additionally advantageous to provide self-diagnostic functions and notifications of safety features, such as braking components, in autonomous vehicles that may not respond as well to traditional feedbacks provided in non-autonomous vehicles.

SUMMARY

One aspect of this disclosure is directed to a brake pad apparatus having a backing plate and a friction lining. The friction lining may have a tribological surface and a transverse surface. The brake pad apparatus may further comprise a conductive material disposed upon the transverse surface and electrically coupled to a conductivity sensor. The conductivity sensor may measure the conductivity of the conductive material and generate corresponding conductivity data that correlates to the remaining life of the brake pad. The brake pad apparatus may comprise a wireless transmitter configured to transmit the conductivity data. The brake pad apparatus may comprise a number of insulation coatings disposed in relation to the conductive material that form dielectric barriers with the friction lining or backing plate. The insulation coatings may further protect the conductive material from corrosion or interference from environmental condition, such as particulates.

Another aspect of this disclosure is directed to a brake pad monitoring system comprising a brake pad apparatus having a backing plate, friction lining, conductive material, and conductivity sensor. The conductivity sensor may generate conductivity data correlating to the remaining life of the brake pad. The brake pad monitoring system may comprise a processor operable to receive the conductivity data and report on the remaining life of the brake pad to a user in response to the conductivity data. The processor may be in wireless communication with the conductivity sensor.

A further aspect of this disclosure is directed to a method of assembling a brake pad apparatus having a backing plate, a friction lining, a conductive material disposed in relation to the remaining life of the friction lining, and a number of insulation layers disposed in relation to the conductive material. The method may further comprise steps to assemble a brake pad apparatus having a conductivity sensor. The method may further comprise steps to assemble a brake pad apparatus having a wireless transmitter.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
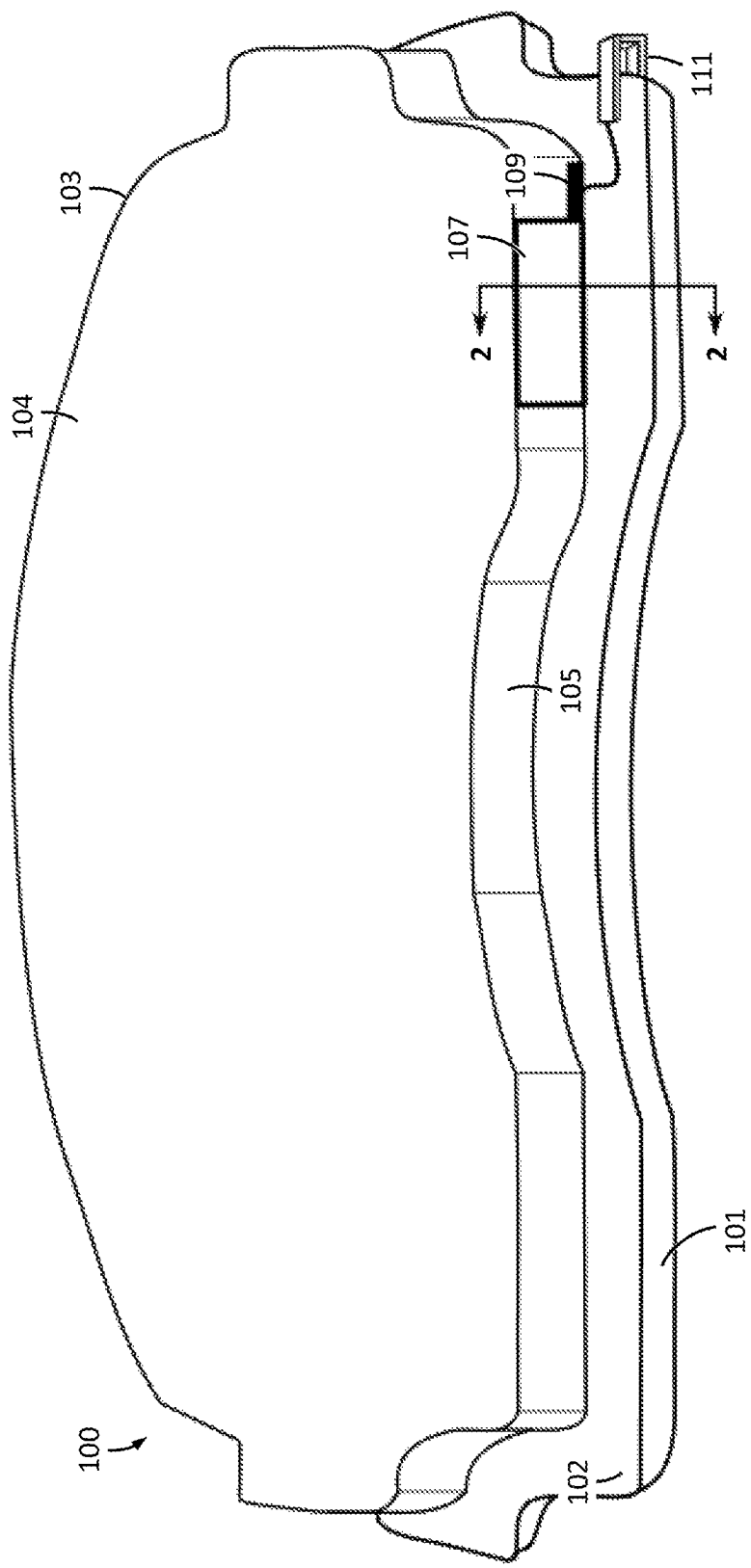
FIG. 1 is a view of brake pad apparatus having a wear sensor using conductivity measurements.

FIG. 1 shows a brake pad apparatus 100 according to an embodiment of the teachings disclosed herein. Brake pad apparatus 100 comprises a backing plate 101 having a mounting surface 102 upon which a friction lining 103 is coupled. In the depicted embodiment, backing plate 101 may comprise a steel backing plate, but other embodiments may comprise other materials or configurations without deviating from the teachings disclosed herein. In the depicted embodiment, friction lining 103 may comprise a composite material, but other embodiments may comprise other materials or configurations without deviating from the teachings disclosed herein.

Friction lining 103 provides a friction force to a rotor of a vehicle (not shown) during a braking function of the vehicle. To preserve the rotor and the safe function of the vehicle, friction lining 103 is intended to act as a sacrificial component that will wear away over time with repeated braking of the vehicle. During braking, friction lining 103 applies friction forces to the rotor at a tribological surface 104. In the depicted embodiment, tribological surface 104 is substantially parallel from the mounting surface 102 at a distance defined by a transverse surface 105 of friction lining 103, but other embodiments may comprise other configurations without deviating from the teachings disclosed herein. During regular use of the brake pad apparatus 100, the tribological surface 104 wears away, eroding the friction lining 103 and effectively reducing the total width of transverse surface 105.

Because transverse surface 105 decreases in width as friction lining 103 wears away during normal use of brake pad apparatus 100, measuring the width of transverse surface 105 may provide an indication of the expected remaining lifespan of the friction lining 103. In the depicted embodiment, a conductivity probe 107 is disposed upon the transverse surface 105. Because the conductivity of conductive materials is strongly correlated to the physical dimensions of the material, the conductivity probe 107 may provide conductivity measurements that directly correlate to the width of the probe. In the depicted embodiment, conductivity probe 107 is as wide as transverse surface 105 and may have wear characteristics similar to those of friction lining 103.

The expected wear of friction lining 103 may be characterized by a number of measurable wear characteristics. The wear characteristics may include durability, hardness, compressibility, coefficient of friction, lubrication, or other measurable characteristics one of ordinary skill in the art would recognize as contributing to the functional lifespan of friction lining 103. In order to optimize the effectiveness of conductivity probe 107 in generating conductivity measurements that correlate to the current state of friction lining 103, the wear characteristics of conductivity probe 107 may be very similar to the wear characteristics of friction lining 103. In some embodiments, conductivity probe 107 may exhibit wear characteristics within a threshold value of each of the wear characteristics of friction lining 103. Matching wear characteristics to within this threshold value optimizes the accuracy of the correlation of conductivity data with respect to the dimensions of the conductivity of conductivity probe 107.

In some embodiments, conductivity probe 107 may exhibit wear characteristics that result in faster erosion of the conductivity probe 107 than friction lining 103. In such embodiments, conductivity probe 107 may erode to beneath the plane of tribological surface 104 and maintain its dimensions until friction lining 103 erodes to the same level because the conductivity probe 107 will only make contact with the rotor when its width is at least as wide as that of the transverse surface 105 of friction lining 103.

Conductivity probe 107 is electrically connected to a conductivity sensor 109 operable to generate conductivity data corresponding to the physical condition of the conductivity probe 107. In the depicted embodiment, conductivity sensor 109 is electrically coupled to a wireless transmitter 111 for transmission to an external processor (not shown), but other embodiments may comprise other arrangements without deviating from the teachings disclosed herein. In some embodiments, conductivity sensor 109 may be electrically coupled directly to a processor. In some embodiments, conductivity sensor 109 may comprise a processor for analysis of the conductivity data without the need for an external processor. In some embodiments, conductivity sensor 109 may be configured to continuously measure the conductivity of conductivity probe 107 and generate corresponding data. In some embodiments, conductivity sensor 109 may be configured to only provide conductivity data in response to a request from an external processor (not shown). In such embodiments, conductivity sensor 109 may comprise a receiver (not shown) operable to receive commands requesting a measurement and report of current conductivity data.

In some such embodiments, wireless transmitter 111 may comprise a wireless transceiver operable to receive commands from the external processor and provide the commands to the conductivity sensor 109. Wireless transmitter 111 may be advantageously coupled to backing plate 101 such that it does not interfere with the normal safe braking operation of brake pad apparatus 100, but other embodiments may comprise other arrangements without deviating from the teachings disclosed herein. In the depicted embodiment, wireless transmitter 111 comprises an adjustable-width detachable coupling mechanism, and is detachably coupled to the backing plate 101, but other embodiments may comprise other configurations without deviating from the teachings herein. In some embodiments, wireless transmitter 111 may be coupled to the backing plate 101 using an elastic mechanism, a deforming coupling mechanism, a nut-and-bolt mechanism, a latching mechanism, or any other alternative coupling mechanism recognized by one of ordinary skill in the art without deviating from the teachings herein.

Figure 2:
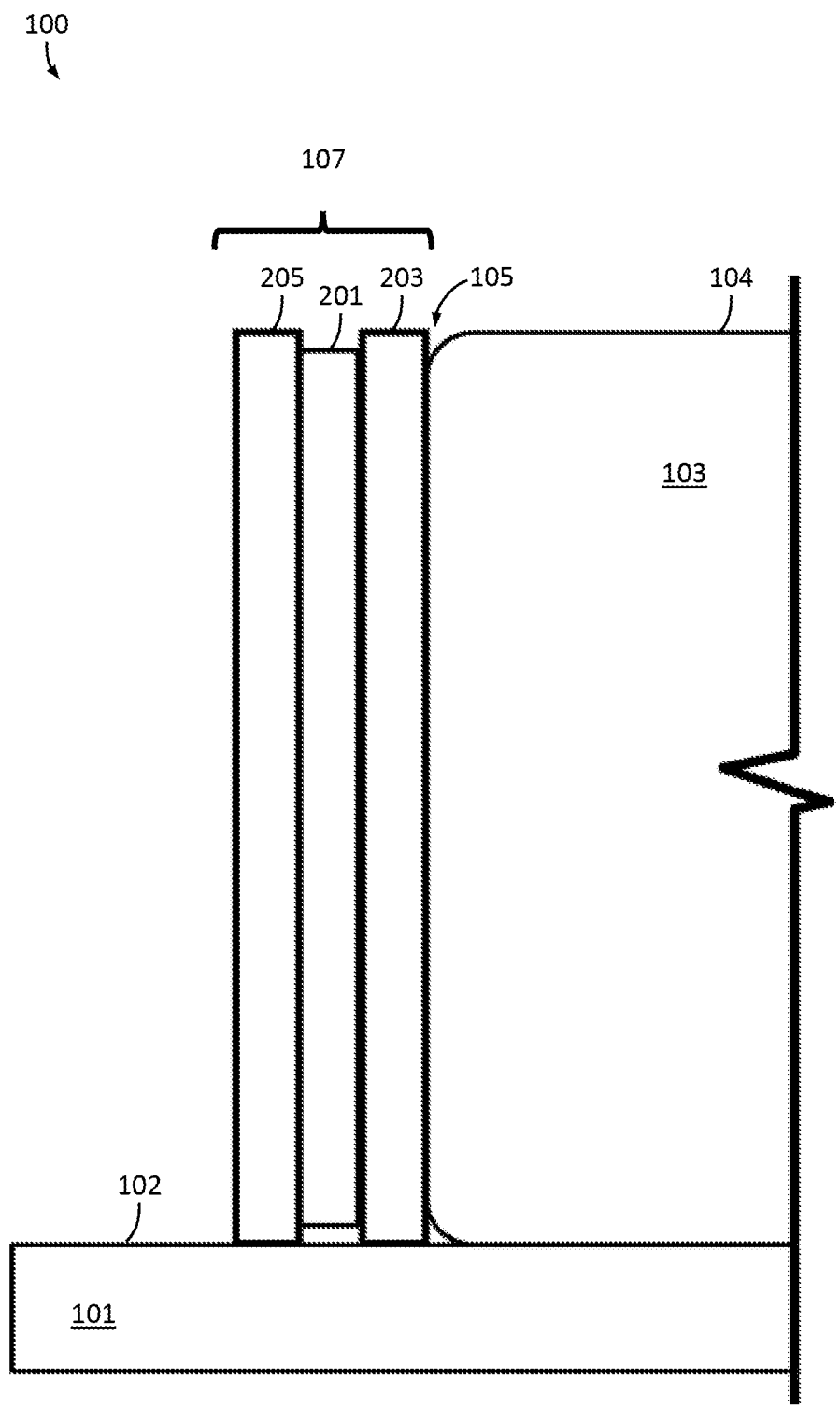
FIG. 2 is an alternative view of a conductivity probe used by the wear sensor of FIG. 1.

Conductivity probe 107 is coupled to transverse surface 105. Because friction lining 103 may be comprised of a conductive material, conductivity probe 107 may require insulation of its conductive components from friction lining 103. FIG. 2 illustrates a diagrammatic view of conductivity probe 107 when disposed upon transverse surface 105. Conductivity probe 107 comprises a conductivity material 201 providing the conductor for measuring conductivity along the width of transverse surface 105. Conductivity probe 107 may comprise a first insulation coating 203 to electrically insulate conduction material 201 from friction lining 103. Conductivity probe 107 may additionally comprise a second insulation coating 205 to electrically insulate conduction material 201 to environmental conditions. First insulation coating 203 and second insulation coating 205 may also physically isolate conductive material 201 from particulates in the environment that may alter the conductivity of conductive material 201. Changes to conductivity may result from conductive particulates from the environment, or from long-term exposure to particulates that corrode the conductive material 201. Isolating conductive material 201 from particulates may therefore improve the accuracy of the conductivity measurements as a correlated measurement to the remaining lifespan of the friction lining 103.

Figure 3:
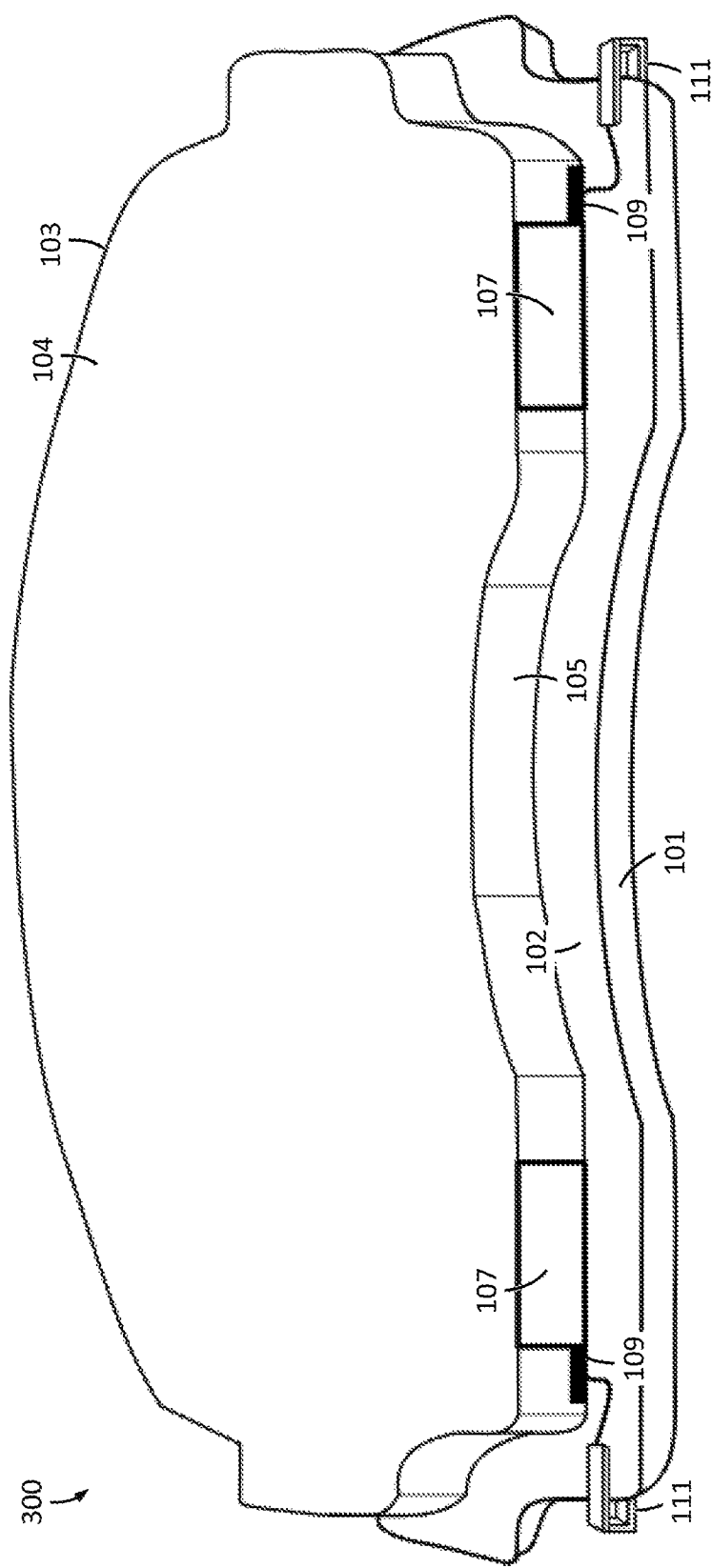
FIG. 3 is a view of a brake pad apparatus having a plurality of wear sensors using conductivity measurements.

Some embodiments may comprise other arrangements having additional features. FIG. 3 is an illustration of a brake pad apparatus 300 that is very similar to brake pad apparatus 100 (see FIG. 1), but also including additional conductivity measurement apparatus. Brake pad apparatus 300 is functionally similar to brake pad apparatus 100, but additionally includes two conductivity probes 107, two conductivity sensors 109 and two wireless transmitters 111. Each of the conductivity sensors 109 is electrically connected to only one of conductivity probes 107, and each of the wireless transmitters 111 is electrically connected to only one of conductivity sensors 109. Each of the wireless transmitters 111 may be operable to transmit independent sets of conductivity data. Independent sets of conductivity data may advantageously provide a processor with an indication of uneven wear at various portions of friction lining 103. Brake pad apparatus 300 comprises two portions of transverse surface 105 featuring conductivity measuring elements, but other embodiments may comprise alternative configurations having different or additional arrangements of conductivity probes 107, conductivity sensors 109, and wireless transmitters 111. In some embodiments, the entirety of transverse surface 105 may have a conductivity probe 107 disposed thereon, the conductivity probe 107 effectively measuring the overall erosion of friction lining 105.

Figure 4:
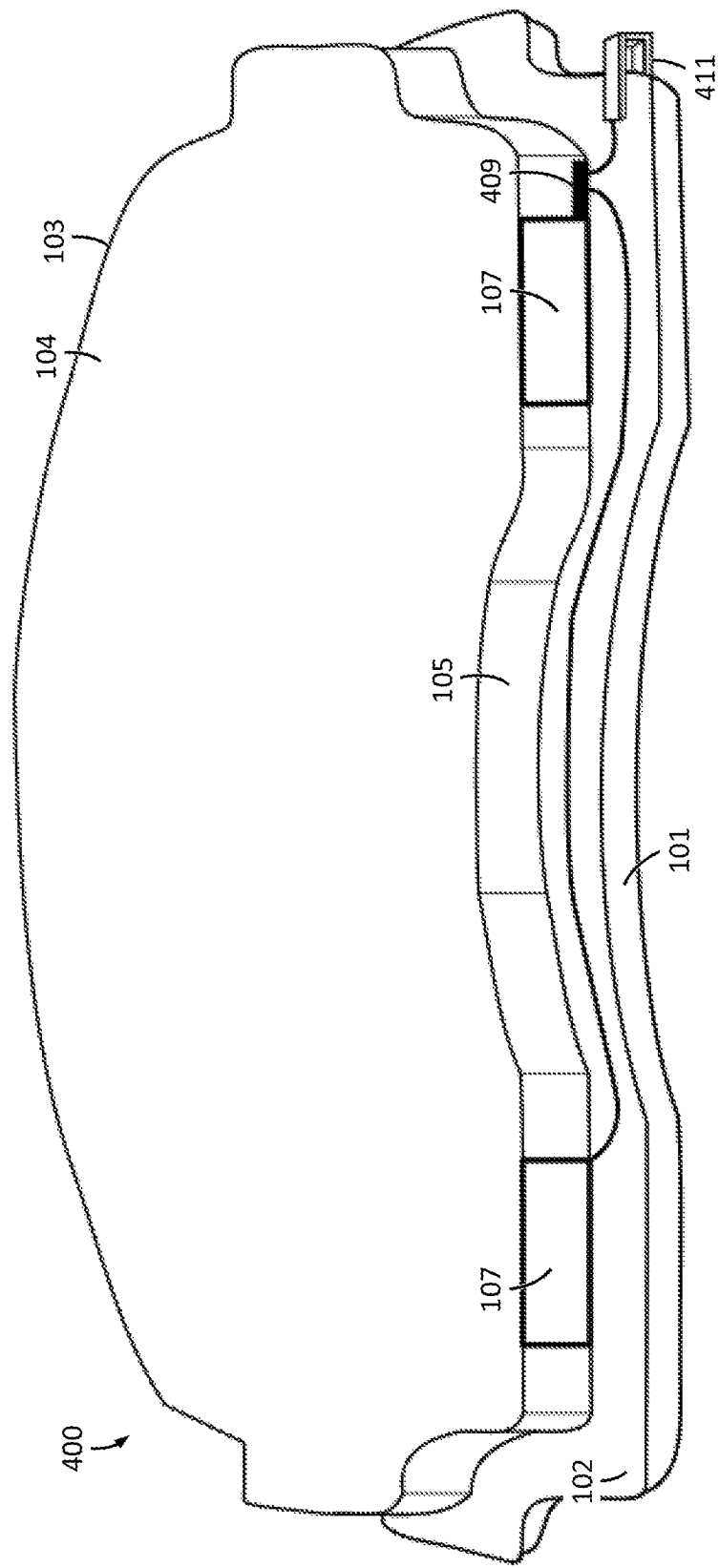
FIG. 4 is a view of a brake pad apparatus having a plurality of conductivity probes to be used by a wear sensor.

Some embodiments may comprise alternative configurations to monitor conductivity conditions. FIG. 4 illustrates a brake pad apparatus 400 that comprises a number of conductivity probes 107 (see FIG. 1, FIG. 2) electrically connected to a single smart conductivity sensor 409. Smart conductivity sensor 409 may differ from conductivity sensor 109 (see FIG. 1) by accepting a number of inputs from a corresponding number of conductivity probes 107. Smart conductivity sensor 409 may be operable to generate conductivity data corresponding to each of the conductivity probes 107, and may also be operable to provide the conductivity data in such a format as to distinguish which of the conductivity probes 107 has provided a particular portion of the total data. In some embodiments, smart conductivity sensor 409 may comprise a processor operable to perform elementary analytics suitable to determine the conductivity of friction lining 103. In some embodiments, smart conductivity sensor 409 may be in data communication with a processor.

In the depicted embodiments of FIG. 1, FIG. 3, and FIG. 4, the respective conductivity sensors are in data communication with a wireless transmitter 111. In some embodiments, multiple conductivity sensors may be in data communication with a single wireless transmitter. In some embodiments, each conductivity sensor may be in data communication with a dedicated wireless transmitter. Some embodiments may comprise alternative arrangements having a number of wireless transmitters in communication with different numbers of conductivity sensors without deviating from the teachings disclosed herein. Other embodiments may comprise alternative arrangements having direct data communication between one or more conductivity sensors and a processor or processors without the need for wireless transmission.

Figure 5:
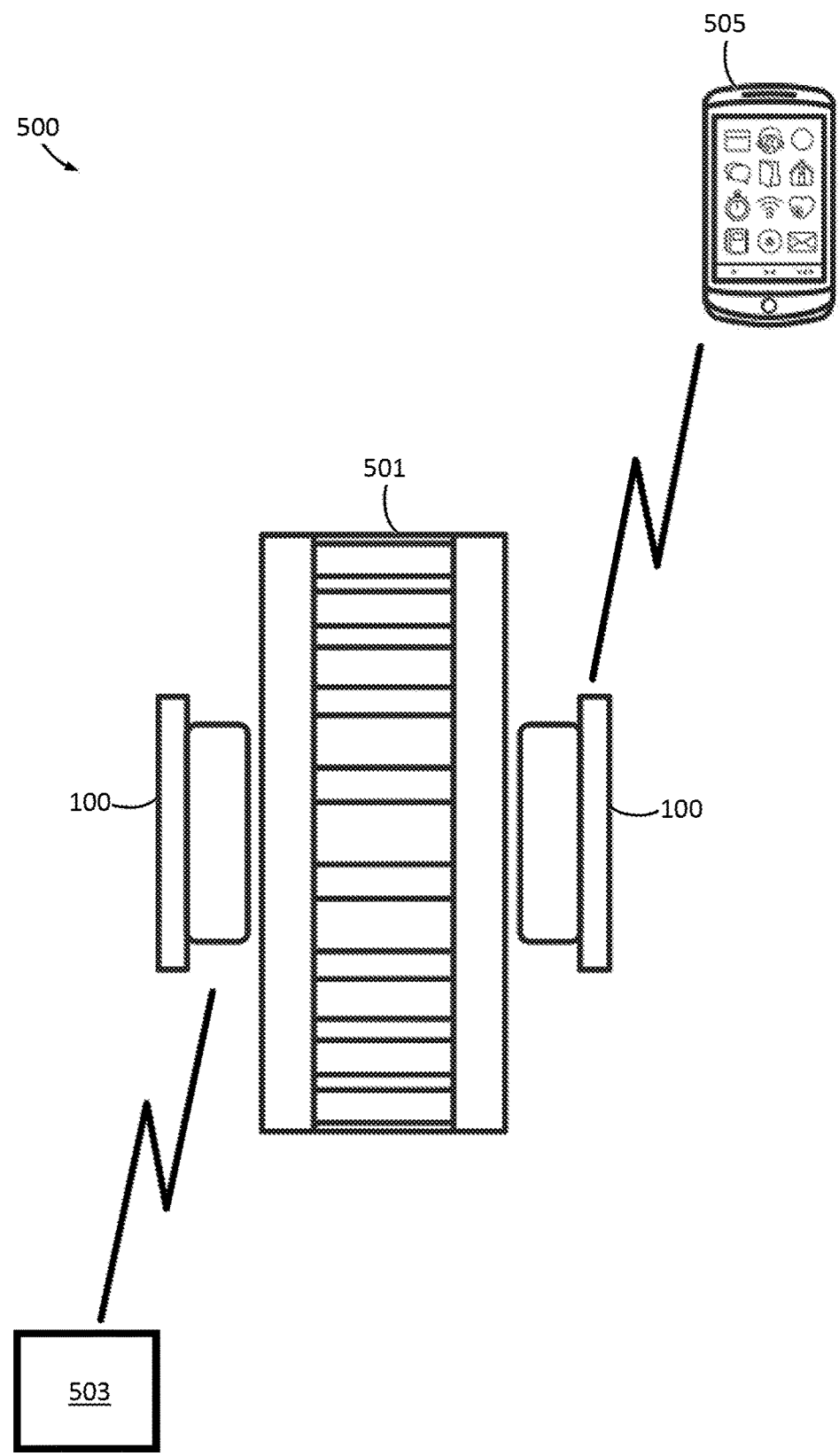
FIG. 5 is a diagrammatic illustration of a brake pad monitoring system utilizing a brake pad apparatus using conductivity sensors.

FIG. 5 is a diagrammatic view of a brake pad monitor system 500 utilizing a brake pad apparatus according to an embodiment of the teachings disclosed herein. In the depicted embodiment, the brake pad apparatuses are in the form of brake pad apparatus 100 (see FIG. 1), but other embodiments of monitor system 500 may comprise other configurations of a brake pad apparatus without deviating from the teachings disclosed herein.

In the depicted embodiment, each of brake pad apparatuses 100 is in data communication with a processor using a wireless connection. In the depicted embodiment, each of brake pad apparatuses 100 is transmitting to one processor, but other embodiments may transmit to a different number of available processors. In the depicted embodiment, a processor may be configured as an electronic control unit (ECU) 503 of the vehicle. ECU 503 may be configured to present the conductivity data to a vehicle processor (not shown) for analysis and determination of the remaining expected lifespan of the associated brake pad apparatuses. For example, a vehicle processor may utilize the data collected by ECU 503 to estimate the remaining lifespan of the associated brake pad apparatus 100 and provide feedback to a user via a user interface (not shown) illustrating the estimated remaining lifespan. The user interface may comprise a console display, a vehicle head unit, a dashboard indicator light, or any other alternative interface element known to one of ordinary skill in the art without deviating from the teachings disclosed herein. In some embodiments, the vehicle processor may present recommendations for maintenance or replacement to the user via the user interface if the ECU 503 reports that the current conductivity data corresponds to a thickness of the friction lining 103 (see FIG. 1) that is below a threshold value.

In the depicted embodiment, a processor may be configured as a smart phone 505. Smart phone 505 may be configured to analyze the conductivity data and estimate the remaining lifespan of the associate brake pad apparatuses. Smart phone 505 may report the estimated remaining lifespan of the associated brake pad apparatuses to the user via a user interface of the smart phone 505. In some embodiments, the smart phone 505 may present recommendations for maintenance or replacement of one or more brake pad apparatuses to the user via the user interface of smart phone 505 when the current conductivity data corresponds to a thickness of the friction lining 103 (see FIG. 1) that is below a threshold value.

The depicted embodiment comprises processors in the form of ECU 503 and smart phone 505, but other embodiments may comprise other or additional processors without deviating from the teachings herein. Processors may comprise a vehicle processor, a diagnostic tablet processor, a personal computer, a remote server, a vehicle diagnostic dongle configured to interface with a diagnostic port of a vehicle, or any other alternative configurations recognized by one of ordinary skill in the art without deviating from the teachings disclosed herein.

The processors of a brake pad monitor system 500 may advantageously request conductivity data under predetermined conditions in order to minimize energy requirements of the conductivity sensors 107 and/or wireless transmitters 111 (see FIG. 1). In some embodiments, requests for conductivity data may occur at regularly timed intervals, such as every 30 minutes of active driving time of the vehicle. In some embodiments, requests for conductivity data may occur upon activation of the vehicle prior to driving the vehicle. In some embodiments, requests for conductivity data may occur after surpassing a predetermined distance, such as every 100 miles. Some embodiments may utilize some or all of these conditions. Some embodiments may utilize other or additional conditions to request conductivity data without deviating from the teachings disclosed herein.

Rotor 501 may be manufactured using electrically conductive materials. Because of this, a processor of brake pad monitor system 500 may be configured to request conductivity data only when the vehicle is not in an active braking operation, as during an active braking operation the conductive probe 107 (see FIG. 1) may be in contact with rotor 501, yielding a compromised measurement. In some embodiments, a processor may be operable to discard measurements that were obtained during an active braking operation. In some embodiments, a processor may be configured to dismiss conductivity data that demonstrates data trends associated with a braking operation.

Conductivity probe 107 (see FIG. 2) may be assembled as a pre-fabricated element and coupled to transverse surface 105. The coupling of conductivity probe 107 may be accomplished using a mechanical or adhesive coupling.

In some embodiments, a friction lining (see FIG. 1, FIG. 2) may comprise a material that is ill-suited to mechanical or adhesive coupling. In such embodiments, the conductivity probe may be assembled directly onto the transverse surface using an application of its components as liquid-state materials that may be dried or cured to bond to transverse surface, which may result in a more stable coupling.

Figure 6:
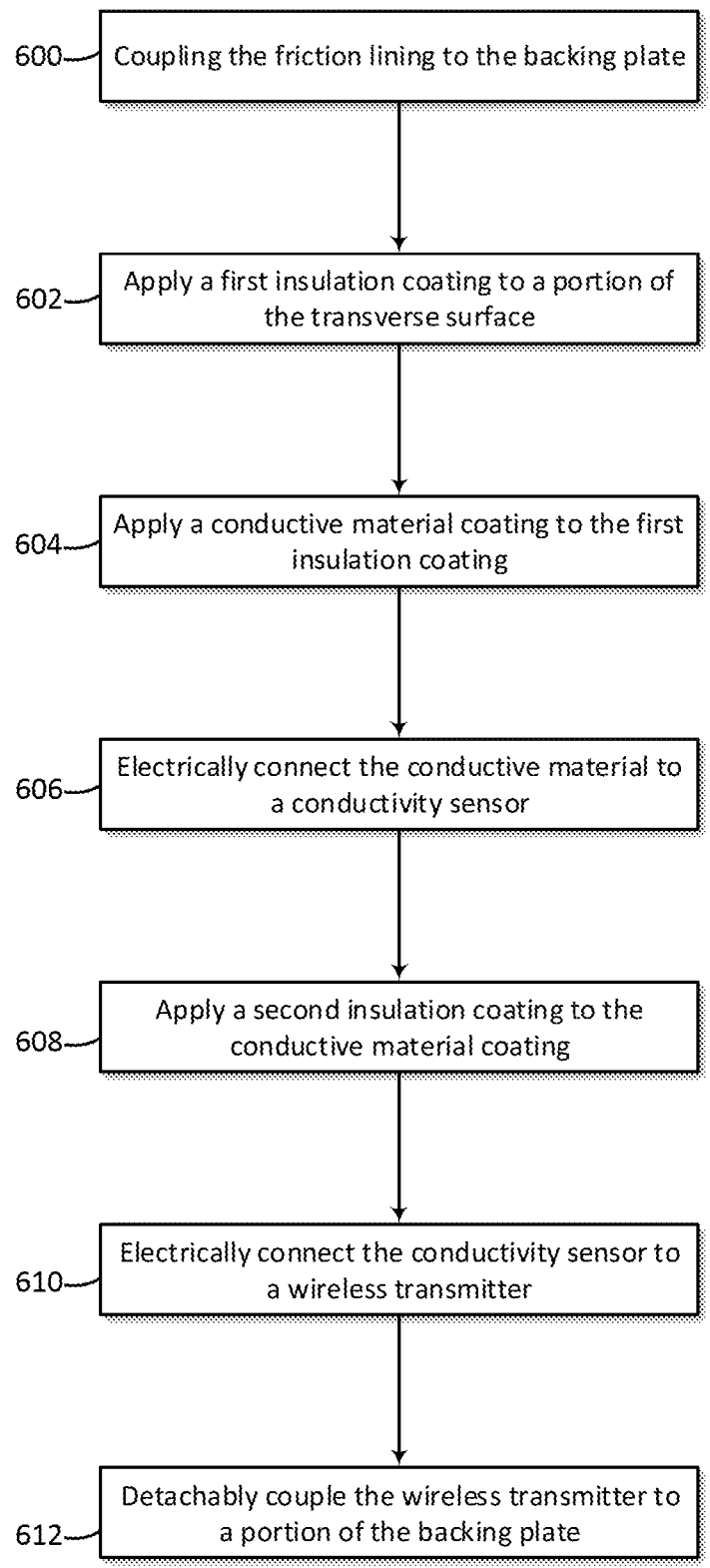
FIG. 6 is a flowchart illustrating an assembly process for a brake pad apparatus having conductivity-based measurements of the wear on a friction lining of the brake pad apparatus.

FIG. 6 is a flowchart providing a method of assembling a brake pad apparatus according to one embodiment of the teachings herein. The method begins at step 600 with the coupling of a friction lining to a backing plate. The coupling of the friction lining may be achieved by mechanical, adhesive, or bonding means known to one of ordinary skill in the art. The friction lining will feature a tribological surface and a transverse surface once coupled to the backing plate.

At step 602, a portion of the transverse surface is chosen as a site for a conductivity probe, and a first insulation coating is applied to the chosen portion of the transverse surface as a liquid material. The liquid form of the first insulation coating may be permitted to dry or may be cured to form a stable bond to the transverse surface.

At step 604, the conductive material of the conductive probe is applied to the first insulation coating. In the depicted embodiment, the conductive material is similarly applied using a spray-coating technique, which may be followed by a drying or curing phase of the conductive material. Other embodiments may utilize a solid conductor of predetermined dimensions being disposed upon the first insulation coating instead of an additional coating. Some embodiments may utilize an adhesive to couple the conductive material to the first insulation coating.

At step 606, after the conductive material has been disposed upon the first insulation coating, the conductive material is electrically connected to a conductive sensor.

At step 608, a second insulation coating is applied to the conductive material. In the depicted embodiment, the second insulation coating is applied using a similar spray-coating technique, which may be followed by a drying or curing phase of the second insulation coating. Other embodiments may utilize a second insulation coating having a solid form, which is applied to the conductive material using an adhesive. In the depicted embodiment, the second insulation coating may comprise the same material as the first insulation coating, but other embodiments may comprise other configurations using different materials for the first insulation coating and the second insulation coating. For example, in one embodiment the first insulation coating may be selected to optimize electrical insulation and bonding of the conductive material to the transverse surface of the friction lining, while the second insulation coating may be selected to minimize corrosion of the conductive material due to the environment of the brake pad apparatus. Each of the first insulation coating, the conductive material, and the second insulation coating may exhibit wear characteristics similar to those of the friction lining within a threshold value in order to achieve a useful correlation of conductivity data to the expected lifespan of the friction lining.

At step 610, the conductivity probe is complete, and the conductivity sensor is electrically connected to a wireless transmitter such that the wireless transmitter is operable to transmit conductivity data generated by the conductivity sensor during conductivity measurements to an external processor. In some embodiments, the wireless transmitter may be disposed within the conductivity sensor. In some embodiments, the conductivity sensor may be connected to an external processor using a wired connection.

At step 612, the wireless transmitter may be detachably coupled to the backing plate of the brake pad apparatus, completing the assembly of the brake pad apparatus according to this embodiment of the teachings disclosed herein. In the depicted embodiment, the wireless transmitter may be detachably coupled to the backing plate using an adjustable-width clipping mechanism, but other embodiments may comprise other arrangements having other coupling mechanisms. In some embodiments, the coupling of the wireless transmitter may not be a detachable coupling. Step 612 may be optional for embodiments not comprising a wireless transmitter or not comprising a wireless transmitter that is separate from the conductivity sensor.

In some embodiments, steps 602 through 608 may be repeated if multiple conductivity probes are desired to monitor the lifespan of the friction lining. In some embodiments, the electrical connection of the conductive material to the conductivity sensor may occur after the application of the second insulation coating without deviating from the teachings disclosed herein. In some embodiments, one or both of the first insulation coating or the second insulation coating may be omitted from the brake pad apparatus without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A brake pad apparatus comprising:
   a backing plate having a mounting surface;
   a friction lining coupled to the mounting surface having a tribological surface substantially parallel to the mounting surface and a transverse surface substantially perpendicular to the tribological surface, the transverse surface having a traverse width substantially defining the distance of the tribological surface from the mounting surface;
   a first insulation coating disposed upon a portion of the transverse surface and having a first coating width substantially equal to the transverse width;
   a conductive material disposed upon the first insulation coating and having a conductive width substantially equal to the first coating width;
   a second insulation coating disposed upon the conductive material and having a second coating width substantially equal to the conductive width;
   a conductivity sensor electrically coupled to the conductive material and operable to measure the conductivity of the conductive material and generate corresponding conductivity data; and
   a wireless transmitter detachably coupled to the backing plate and in data communication with the conductivity sensor, the wireless transmitter operable to wirelessly transmit the conductivity data generated by the conductivity sensor.

2. The brake pad apparatus of claim 1, wherein the first insulation coating and the second insulation coating are constructed of the same material.

3. The brake pad apparatus of claim 1, wherein the wear characteristics of the conductive material are within a threshold value of the wear characteristics of the friction lining along the tribological surface.

4. The brake pad apparatus of claim 1, further comprising:
   a third insulation coating disposed upon a portion of the transverse surface different than the portion upon which the first insulation coating is disposed and having a third coating width substantially equal to the transverse width;
   a second conductive material disposed upon the third insulation coating and having a second conductive width substantially equal to the third coating width; and a fourth insulation coating disposed upon the second conductive material and having a width substantially equal to the width of the transverse surface.

5. The brake pad apparatus of claim 4, further comprising a second conductivity sensor electrically coupled to the second conductive material and operable to measure the conductivity of the conductive material and generate corresponding second conductivity data.

6. The brake pad apparatus of claim 5, further comprising a second wireless transmitter detachably coupled to the backing plate and in data communication with the second conductivity sensor, the second wireless transmitter operable to wirelessly transmit the second conductivity data.

7. The brake pad apparatus of claim 5, wherein the second conductive material is electrically coupled to the conductivity sensor and the conductivity sensor comprises a smart sensor operable to independently measure the conductivity of a plurality of conductive material couplings and to generate conductivity measurements corresponding to each of the conductive material couplings.

8. The brake pad apparatus of claim 1 (adjustable clip to detachably couple wireless transmitter to backing plate), wherein the wireless transmitter is detachably coupled to the back plate using an adjustable-width clip mechanism.

9. A method for modifying a brake pad assembly having a backing plate and a friction lining comprising a tribological surface and a transverse surface having a transverse width substantially perpendicular to the tribological surface, the tribological surface substantially parallel to the backing plate at a distance substantially equal to the transverse width, the method comprising:
applying to a portion of the transverse surface a first insulation coating along the transverse width;
applying to the first insulation coating a conductive material along a width substantially equal to the width of the first insulation coating; and
applying to the conductive material a second insulation coating along a width substantially equal to the width of the conductive material.

10. The method of claim 9, further comprising a step of electrically connecting the conductive material to a conductivity sensor.

11. The method of claim 10, wherein the step of electrically connecting the conductive material to the conductivity sensor is performed prior to the step of applying the second insulation coating.

12. The method of claim 10, further comprising the steps of:
electrically connecting the conductivity sensor to a wireless transmitter; and
detachably coupling the wireless transmitter to the backing plate.

13. The method of claim 9, wherein the step of applying the first insulation coating comprises spraying the material of the first insulation coating onto the transverse surface.

14. A brake monitor system comprising:
a brake pad assembly having a backing plate and a friction lining coupled to a mounting surface of the backing plate, the friction lining comprising a tribological surface and a transverse surface substantially perpendicular to the tribological surface, the tribological surface disposed in a substantially parallel fashion to the mounting surface at a distance substantially equal to the width of the transverse surface;
a first insulation coating disposed upon a portion of the transverse surface and having a width substantially equal to the width of the transverse surface;
a conductive material disposed upon the first insulation coating and having a width substantially equal to the width of the first insulation coating;
a second insulation coating disposed upon the conductive material and having a width substantially equal to the width of the conductive material;
a conductivity sensor electrically connected to the conductive material and operable to measure the conductivity of the conductive material and generate corresponding conductivity data;
a transmitter in data communication with the conductivity sensor and operable to transmit the conductivity data; and
a processor in data communication with the transmitter and operable to receive the conductivity data.

15. The brake pad monitor system of claim 14, wherein the transmitter comprises a wireless transmitter and the processor is in wireless data communication with the transmitter.

16. The brake pad monitor system of claim 14, wherein the processor comprises an electronic control unit (ECU) of a vehicle.

17. The brake pad monitor system of claim 14, wherein the processor comprises a smart phone.

18. The brake pad monitor system of claim 14, further comprising a control receiver in data communication with the conductivity sensor and an external controller, the control receiver operable to receive control instructions from the external controller and generate conductivity data in response to received control instructions for transmission by the transmitter.

19. The brake pad monitor system of claim 18, wherein the control receiver comprises a wireless control receiver in wireless data communication with the external controller.

20. The brake pad monitor system of claim 18, wherein the processor comprises the external controller.

* * * * *